United States Patent
Nachappa et al.

(10) Patent No.: US 10,265,798 B2
(45) Date of Patent: Apr. 23, 2019

(54) MAGNETIC PULSE WELDING OF ENGINE COMPONENTS

(71) Applicant: MAHLE International GmbH, Stuttgart (DE)

(72) Inventors: Nikhil Nachappa, Dearborn, MI (US); Searle Frei, Fremont, MI (US); Steven J. Sytsma, Muskegon, MI (US)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 224 days.

(21) Appl. No.: 15/337,177

(22) Filed: Oct. 28, 2016

(65) Prior Publication Data

US 2018/0119634 A1    May 3, 2018

(51) Int. Cl.
| | |
|---|---|
| *F16J 9/26* | (2006.01) |
| *B23K 20/227* | (2006.01) |
| *B23K 20/06* | (2006.01) |
| *B23K 103/04* | (2006.01) |
| *B23K 103/18* | (2006.01) |
| *B23K 101/00* | (2006.01) |

(52) U.S. Cl.
CPC ............ *B23K 20/227* (2013.01); *B23K 20/06* (2013.01); *F16J 9/26* (2013.01); *B23K 2101/003* (2018.08); *B23K 2103/04* (2018.08); *B23K 2103/05* (2018.08); *B23K 2103/18* (2018.08)

(58) Field of Classification Search
CPC ......... B23K 20/06; B23K 2203/18; F16J 9/26
See application file for complete search history.

(56) References Cited

U.S. PATENT DOCUMENTS

| | | | |
|---|---|---|---|
| 1,680,369 A | | 8/1928 | Dugan |
| 3,153,542 A | | 10/1964 | Ronay |
| 4,469,356 A | | 9/1984 | Duret et al. |
| 4,497,102 A | | 2/1985 | Ikutake |
| 5,981,921 A | * | 11/1999 | Yablochnikov ........ B23K 20/06 219/603 |
| 6,452,139 B1 | * | 9/2002 | Benoit ................... B23K 20/06 219/608 |

(Continued)

FOREIGN PATENT DOCUMENTS

| | | |
|---|---|---|
| CH | 319343 | 2/1957 |
| DE | 698345 | 11/1970 |

(Continued)

OTHER PUBLICATIONS

Haiping Yu, Zhisong Fan and Chunfeng Li, Magnetic Pulse Cladding of Aluminum Alloy on Mild Steel Tube, Journal of Materials Processing Technology 214 (2014) 141-150.

*Primary Examiner* — Thomas E Lazo (74) *Attorney, Agent, or Firm* — Reising Ethington P.C.

(57) ABSTRACT

A composite engine component comprises a body having an outer circumferential surface and an inner circumferential surface. The body of the engine component is of unitary, integral, one-piece construction and comprises a radially inner section and a radially outer section having different material compositions. The radially inner section and the radially outer section of the body are welded together using a magnetic pulse welding process in which a metallurgical bond is formed along a bonding interface between the inner and outer sections of the body.

14 Claims, 4 Drawing Sheets

(56) References Cited

U.S. PATENT DOCUMENTS

| | | | | |
|---|---|---|---|---|
| 6,510,920 | B1 * | 1/2003 | Durand | F01N 13/18 181/249 |
| 9,028,164 | B2 * | 5/2015 | Yablochnikov | F16D 1/068 403/359.1 |
| 2004/0174014 | A1 * | 9/2004 | Storage | B21D 15/06 285/21.1 |
| 2006/0131300 | A1 * | 6/2006 | Yablochnikov | B23K 13/015 219/617 |

FOREIGN PATENT DOCUMENTS

| | | | |
|---|---|---|---|
| FR | 1257353 | 3/1961 | |
| GB | 471517 | 3/1937 | |
| GB | 471565 | 3/1937 | |
| GB | 1305178 | 6/1971 | |
| WO | WO 0119549 A1 * | 3/2001 | B23K 13/01 |

\* cited by examiner

MAGNETIC PULSE WELDING OF ENGINE COMPONENTS

TECHNICAL FIELD

The present invention generally relates to a method of manufacturing components of an internal combustion engine, and, more specifically, to using magnetic pulse welding to manufacture such components.

BACKGROUND

Reciprocating internal combustion engines typically include a cast iron or aluminum engine block having at least one cylindrical bore formed therein that defines a cylinder in which a reciprocating piston is received. An open-ended ring known as a piston ring is typically positioned within an annular groove formed in an outer circumference of the piston. The intrinsic spring force of the piston ring ensures sufficient contact between the piston ring and an inner wall of the cylinder. During engine operation, the piston moves up and down within the cylinder and the pressure exerted on the cylinder wall by the piston ring produces a seal between the piston and the inner wall of the cylinder. This seal helps prevent escape of combustion gases from the combustion chamber and may help control oil consumption. Piston rings also may help transfer heat away from the piston to the cylinder wall. A cylinder sleeve or liner may be received within the cylindrical bore of the engine block to provide the cylinder with improved thermal characteristics and a compatible wear surface along which the piston can slide.

Thermal gradients may occur within piston rings and cylinder liners during normal engine operation due to the inherent temperature difference between the pistons and the inner walls of the cylinders. For example, in a diesel internal combustion engine, the pistons may operate at temperatures of about 300° C. and the cylinder walls may operate at temperatures of about 115° C. In a piston ring of a reciprocating internal combustion engine, a thermal gradient may occur between an outer portion of the piston ring that is in contact with the relatively cool cylinder wall and an inner portion of the piston ring that is in contact with or in close proximity to the relatively hot piston. In such case, if the inner and outer portions of the piston ring are made of the same material, the inner portion of the piston ring may experience a greater degree of thermal expansion than the outer portion of the piston ring, which may result in an uneven distribution of the radial contact pressure between the piston ring and the cylinder wall. In particular, the generation of a radial thermal gradient within a split piston ring having free ends may result in an increased amount of radial contact pressure between the free ends of the piston ring and the cylinder wall, which may increase the amount of wear at the free ends of the piston ring and also may lead to scuffing of the cylinder wall. In a cylinder liner, a thermal gradient may occur between an outer portion of the liner that is in contact with the relatively cool engine block and an inner portion of the liner that is in contact with or in close proximity to the relatively hot piston.

SUMMARY

According to an aspect of the invention, there is provided a composite engine component. The composite engine component comprises a body having an outer circumferential surface and an inner circumferential surface. The body of the engine component is of unitary, integral, one-piece construction and comprises a radially inner section and a radially outer section having different material compositions. The radially inner section and the radially outer section of the body are metallurgically bonded to one another or to an intermediate section of the body along a bonding interface. The metallurgical bond formed along the bonding interface is produced by a solid-state magnetic pulse welding process, which does not result in the formation of an intermetallic phase along the bonding interface. In addition, the metallurgical bond formed along the bonding interface between the inner and outer sections of the body does not require use of a separate adhesive or filler material.

The inner and outer sections of the body may be made of different metallic materials having different coefficients of thermal expansion and/or different thermal conductivities. For example, the inner section of the body may be made of a metallic material that has a lower coefficient of thermal expansion and a lower thermal conductivity than that of the metallic material from which the outer section of the body is made.

In one form, the composite engine component may comprise a composite piston ring with a split annular body having opposing first and second ends and a gap defined by the opposing first and second ends.

In another form, the composite engine component may comprise a composite cylinder liner.

According to another aspect of the invention, there is provided a method of manufacturing a composite engine component. A first preform having a first bonding surface and a second preform having a second bonding surface are provided. The material composition of the first preform is different from that of the second preform. The first and second preforms are arranged in spaced apart relationship to one another such that the first and second bonding surfaces face one another. The first and second preforms are welded together to form a composite engine component blank using a magnetic pulse welding process in which a metallurgical bond is formed along the first and second bonding surfaces of the first and second preforms.

To weld the first and second preforms together, an inductor coil is placed in proximity to an outer surface of at least one of the first and second preforms. The inductor coil is energized by a passing a high-energy pulse of electrical current through the coil to generate an electromagnetic field around at least one of the first and second preforms such that at least one of the first and second preforms is accelerated away from the inductor coil and into contact with another preform at a sufficient velocity to weld the preforms to one another.

In one form, the composite engine component blank may be formed into the shape of a split annulus.

In another form, the composite engine component blank may be formed into the shape of a cylinder.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION

The presently disclosed composite engine component may be formed by welding two or more engine component preforms together using a magnetic pulse welding process (MPW), wherein a metallurgical bond is formed along a bonding interface between the preforms by bringing the preforms into contact with one another at high velocity and without addition of heat. As compared to conventional fusion welding processes, wherein metal workpieces are locally melted by application of heat and fused together to form a permanent joint, the presently disclosed solid-state magnetic pulse welding process does not degrade the mechanical properties of the preforms at the bonding interface, for example, by producing brittle intermetallic phases or changing the microstructure of the preforms along the bonding interface.

The presently disclosed solid-state magnetic pulse welding process allows preforms having different material compositions to be joined together to produce composite engine components with different chemical, mechanical, thermal, and/or tribological properties along their inner and outer circumferential surfaces. For example, each of the preforms used to form the composite engine component may be made of a metallic material. However, at least one of the preforms will have a material composition that is different from that of the one or more other preforms used to form the composite engine component.

In one form, a composite piston ring may be manufactured using the presently disclosed solid-state magnetic pulse welding process. In such case, two piston ring preforms having different material compositions may be formed into a composite piston ring having two integrated sections with different material compositions. For example, the composite piston ring may have a radially inner section that defines an inner circumferential surface of the piston ring and a radially outer section that defines an outer circumferential surface of the piston ring, with the radially inner and outer sections of the composite piston ring having different material compositions. In one form, the radially inner section of the composite piston ring may comprise a material that has a relatively low coefficient of thermal expansion and relatively low thermal conductivity, as compared to the material of the radially outer section of the composite piston ring. Constructing the composite piston ring in this way may help reduce if not eliminate variations in the radial pressure distribution exerted by the outer circumferential surface of the piston ring on the cylinder wall, which may help reduce wear at the split ends of the piston ring and scuffing along the cylinder wall.

In another form, a composite cylinder liner may be manufactured using the presently disclosed solid-state magnetic pulse welding process. In such case, two cylinder liner preforms having different material compositions may be formed into a composite cylinder liner having two integrated sections with different material compositions. For example, the composite cylinder liner may have a radially inner section that defines an inner circumferential surface of the cylinder liner and a radially outer section that defines an outer circumferential surface of the cylinder liner, with the radially inner and outer sections of the composite cylinder liner having different material compositions. In one form, the radially inner section of the composite cylinder liner may comprise a material that has relatively low thermal conductivity and relatively high wear resistance, as compared to the material of the radially outer section of the composite cylinder liner.

The following discussion is directed to composite piston rings and methods of manufacturing composite piston rings using a magnetic pulse welding process. However, the present disclosure is not limited to the manufacture of composite piston rings, and applies equally to the manufacture of other cylindrical or annular composite engine components, such as composite cylinder liners. Indeed, the present disclosure may be embodied in many different forms and should not be construed as limited to the embodiments discussed below.

Figures 1, 2, 3:
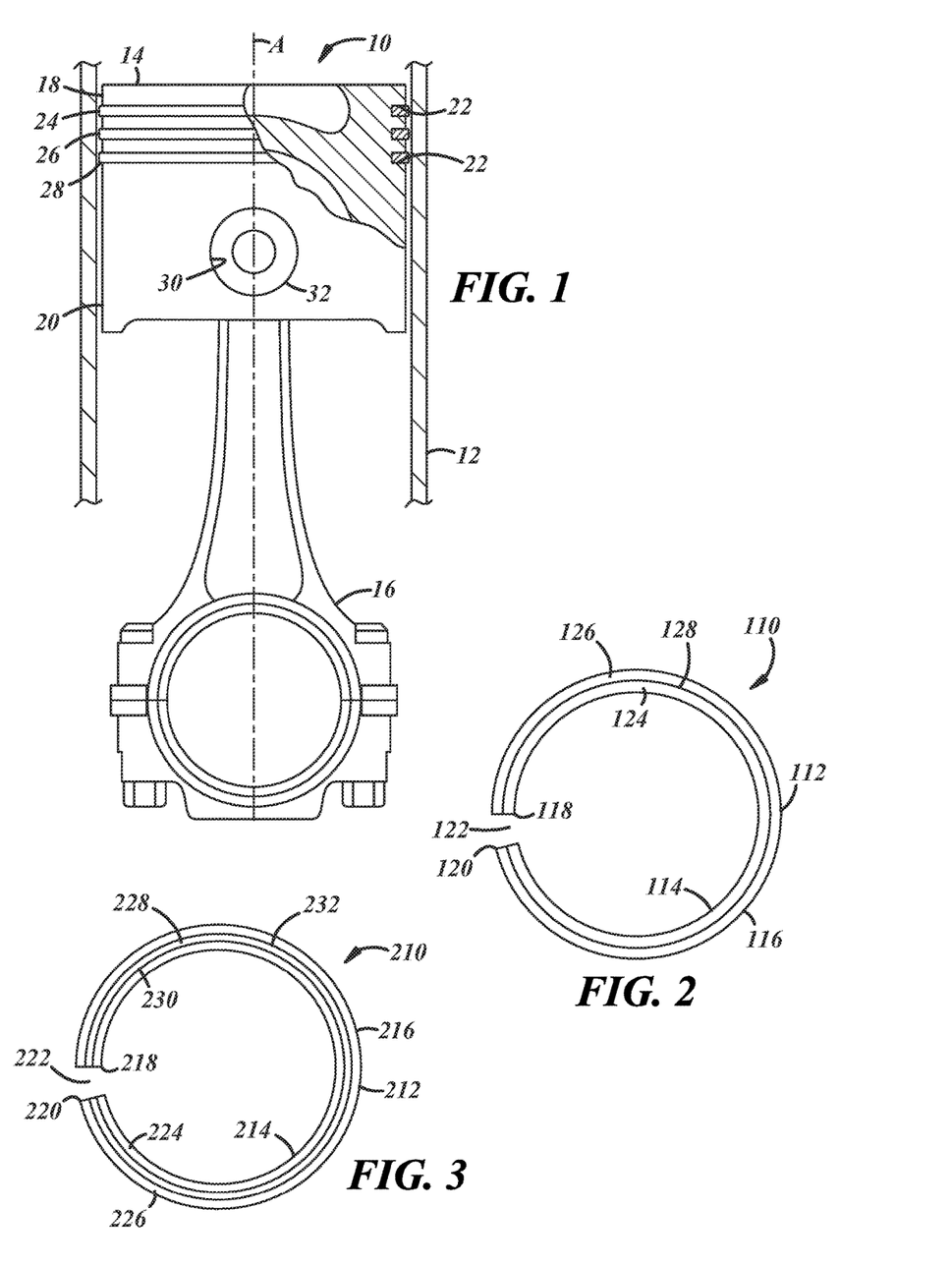
FIG. 1 is a side elevation of a piston and connecting rod assembly for an internal combustion engine.
FIG. 2 is a top view of a composite piston ring comprising two metallic sections joined into an integral structure.
FIG. 3 is a top view of a composite piston ring comprising three metallic sections joined into an integral structure.

FIG. 1 illustrates a piston and connecting rod assembly 10 for use in a cylinder 12 of a reciprocating internal combustion engine (not shown). The assembly 10 has a central longitudinal axis A and comprises a piston 14 and a connecting rod 16. The piston 14 has a body including an upper crown 18 and a lower skirt 20. A plurality of annular grooves 22 are formed about an outer circumference of the crown 18 of the piston 14 and are sized to accommodate three piston rings: an upper compression ring 24, a lower compression ring 26, and an oil control ring 28. Each of the piston rings 24, 26, 28 has an upper surface, a lower surface, an inner circumferential surface that faces toward the crown 18 of the piston 14, and an outer circumferential surface or contact surface that is adapted to contact and slide along an inner wall of the cylinder 12. A pin bore 30 is formed in the skirt 20 of the piston 14 and is sized to receive a piston pin 32 for connecting the piston 14 to a small end of the connecting rod 16.

FIG. 2 illustrates a composite piston ring 110 for a piston of a reciprocating internal combustion engine, such as the piston 14 illustrated in FIG. 1. The piston ring 110 comprises a split annular body 112 having an inner circumferential surface 114, an outer circumferential surface 116, and opposing first and second ends 118, 120 that define a gap 122 therebetween. The body 112 of the piston ring 110 is of unitary, integral, one-piece construction and comprises a radially inner section 124 and a radially outer section 126, which are metallurgically bonded to each other along a bonding interface 128.

The radially inner section 124 of the body 112 has a radially inner portion and a radially outer portion, with the radially inner portion of the inner section 124 defining the inner circumferential surface 114 of the body 112. Also, the radially outer section 126 of the body 112 has a radially inner portion and a radially outer portion, with the radially outer portion of the outer section 126 defining the outer circumferential surface 116 of the body 112. The radially outer portion of the inner section 124 and the radially inner portion of the outer section 126 are metallurgically bonded to each other along the bonding interface 128.

The body 112 of the composite piston ring 110 may have a thickness, measured in a radial direction from the inner circumferential surface 114 to the outer circumferential surface 116, that is substantially uniform. In one form, the thickness of each of the radially inner and outer sections 124, 126 of the body 112 may be substantially the same. In another form, the thicknesses of the radially inner and outer sections 124, 126 of the body 112 may be different. For example, the thickness of the radially inner section 124 may be greater or less than that of the radially outer section 126.

The radially inner section 124 and the radially outer section 126 of the body 112 comprise metallic materials. In one form, one or both of the radially inner and outer sections 124, 126 of the body 112 may comprise a ferrous material (such as cast iron, carbon steel, or stainless steel), a nickel-based, chromium-based, or copper-based material. The composition of each of the sections 124, 126 may be individually selected to provide each section 124, 126 with certain beneficial attributes tailored to their unique operating environments. During engine operation, the radially inner section 124 and the radially outer section 126 of the body 112 will typically be exposed to different thermal, mechanical, and chemical stresses. As such, it may be beneficial for each of these sections 124, 126 to be formed from a different material. For example, the radially inner section 124 of the body 112 may be exposed to higher temperatures than the radially outer section 126. As such, it may be desirable to form the radially inner section 124 of the body 112 from a metallic material having relatively high thermal stability. On the other hand, the radially outer section 126 of the body 112 may be continuously exposed to high impact forces as the piston moves up and down within the cylinder. As such, it may be desirable to form the radially outer section 126 of the body 112 from a metallic material having relatively high wear resistance. The presently disclosed magnetic pulse welding process allows the material composition of the radially inner section 124 and the radially outer section 126 to be tailored to fit their unique operating environments without sacrificing the overall integrity or operational life of the piston ring 110.

In one form, the material compositions of the radially inner and outer sections 124, 126 of the body 112 may be formulated to compensate for radial thermal gradients generated within the piston ring 110 during engine operation by providing the piston ring 110 with a uniform set of thermal and/or mechanical properties. In particular, the material compositions of the radially inner and outer sections 124, 126 of the body 112 may be formulated to exhibit similar thermal behavior and/or similar mechanical properties, even though the radially inner and outer sections 124, 126 of the body 112 may be at different temperatures during operation.

In general, when a material experiences a change in temperature, the material also may experience a change in size. For example, materials generally expand as temperatures increase and contract with decreasing temperatures. The amount a given material expands in response to a change in temperature is referred to as the material's coefficient of thermal expansion (CTE). Materials having relatively high coefficients of thermal expansion will expand to a greater extent in response to a certain increase in temperature than materials with relatively low coefficients of thermal expansion. Therefore, when a conventional piston ring having a uniform material composition is exposed to a radial thermal gradient, the radial inner and outer sections of the piston ring will be exposed to different temperatures and thus will experience different amounts of thermal expansion, which may result in internal stress within the piston ring and also may produce variations in the radial pressure distribution exerted by the piston ring on the cylinder wall. This may produce physical distortions within the ring and may cause the ends or tips of the ring to flare outward in a radial direction toward the cylinder wall, which may increase contact pressure between the tips of the ring and the cylinder wall. Over time, this increased contact pressure may result in increased wear along the outer circumferential surface of the ring near the tips of the ring.

The presently disclosed piston ring 110 is designed to overcome these problems and others by constructing the radially inner and outer sections 124, 126 of the body 112 from two different materials having different chemical, mechanical, thermal, and/or tribological properties and joining these materials together using a magnetic pulse welding process.

In one form, to compensate for operating conditions which may cause the radially inner section 124 of the body 112 to be at a higher temperature than that of the radially outer section 126 during operation, the material composition of the radially inner section 124 may be formulated to have a relatively low coefficient of linear thermal expansion, as compared to the material composition of the radially outer section 126. In one form, the mean coefficient of linear thermal expansion of the material composition of the radially inner section 124 at a temperature in the range of 20-300° C. may be 10-30% less than the mean coefficient of linear thermal expansion of the material composition of the radially outer section 126. More specifically, the mean coefficient of linear thermal expansion of the radially inner section 124 at a temperature in the range of 20-300° C. may be 15-20% less than the mean coefficient of linear thermal expansion of the radially outer section 126. For example, the mean coefficient of linear thermal expansion of the material composition of the radially inner section 124 at a temperature in the range of 20-300° C. may be in the range of $10\text{-}11.5\times10^{-6}/K$, and the mean coefficient of linear thermal expansion of the material composition of the radially outer section 126 at a temperature in the range of 20-300° C. may be in the range of $12\text{-}14\times10^{-6}/K$. In such case, even though the radially inner section 124 of the body 112 may be at a higher temperature than the radially outer section 126 during operation, the extent of thermal expansion experienced by the radially inner and outer sections 124, 126 may be similar.

The material compositions of the radially inner and outer sections 124, 126 of the body 112 also may be formulated to equalize the temperature within the radially inner and outer sections 124, 126 of the body 112, even though the radially inner section 124 is in close proximity to and possibly in contact with the relatively hot piston 14, while the radially outer section 126 is in contact with the relatively cool cylinder 12. This may be accomplished by reducing the rate at which heat is transferred from the piston 14 to the radially inner section 124 of the body 112. The rate at which heat is transferred across a given material is referred to as the material's thermal conductivity. Heat transfer occurs at a lower rate across materials of low thermal conductivity than across materials of high thermal conductivity.

To equalize the temperature within the radially inner and outer sections 124, 126 of the body 112, the material composition of the radially inner section 124 may be selected based upon its relatively low thermal conductivity, as compared to the thermal conductivity of the material composition of the radially outer section 126. In one form, the thermal conductivity of the material composition of the radially inner section 124 at a temperature in the range of 20-300° C. may be 10-30% less than the thermal conductivity of the material composition of the radially outer section 126. More specifically, the thermal conductivity of the radially inner section 124 at a temperature in the range of 20-300° C. may be 15-25% less than the thermal conductivity of the radially outer section 126. For example, the thermal conductivity of the material composition of the radially inner section 124 at a temperature in the range of 20-300° C. may be in the range of 22-25 W/(m·K), and the thermal conductivity of the material composition of the radially outer section 126 at a temperature in the range of 20-300° C. may be in the range of 27-30 W/(m·K). In such case, even though the radially inner section 124 of the body 112 may be exposed to a relatively high temperature environment, as compared to the radially outer section 126, the rate of heat transfer through the radially inner section 124 of the body 112 may be less than that of the radially outer section 126, which may help reduce the temperature difference between the radially inner and outer sections 124, 126 of the body 112.

In one specific example, the material composition of the radially inner section 124 may be a high carbon martensitic stainless steel comprising about 80 wt. % iron (Fe), 17-19 wt. % chromium (Cr), maximum 1.0 wt. % manganese (Mn), maximum 1.0 wt. % silicon (Si), 0.8-0.95 wt. % carbon (C), about 0.9-1.5 wt. % molybdenum (Mo), maximum 0.045 wt. % phosphorus (P), and maximum 0.04 wt. % sulfur (S). One example of a suitable stainless steel material for the radially inner section 124 according to ISO 6621-3, subclass 66, which has a mean coefficient of linear thermal expansion at a temperature in the range of 20-300° C. of about $11.1 \times 10^{-6}$/K and a thermal conductivity at a temperature in the range of 20-300° C. of about 23.5 W/(m·K). Also, the material composition of the radially outer section 126 may be chromium silicon carbon low alloy steel comprising 0.5-0.8 wt. % chromium (Cr), 0.5-0.9 wt. % manganese (Mn), 1.2-1.65 wt. % silicon (Si), 0.5-0.6 wt. % carbon (C), maximum 0.035 wt. % phosphorus (P), maximum 0.04 wt. % sulfur (S), with iron (Fe) as balance. One example of a suitable steel material for the radially outer section 126 is according to ISO 6621-3, subclass 64, which has a mean coefficient of linear thermal expansion at a temperature in the range of 20-300° C. of about $13.4 \times 10^{-6}$/K and a thermal conductivity at a temperature in the range of 20-300° C. of about 28.7 W/(m·K).

The metallurgical bond between the radially inner section 124 and the radially outer section 126 may be formed at room temperature by a solid-state welding process, more specifically, a magnetic pulse welding process wherein a large electromagnetic force is rapidly applied to one or both of the sections 124, 126. This magnetic pulse welding process does not result in the undesirable formation of brittle intermetallic phases along the bonding interface 128 between the sections 124, 126, and does not require a separate adhesive or filler material. In addition, heat is not applied to the preforms during the welding process, and thus many of the problems that can occur during conventional fusion welding processes can be avoided, such as the formation of stress concentrations, weld defects, internal tensile stresses, and corrosion, which are known to weaken welded components. Further, unlike various conventional welding processes, such as friction welding and fusion welding, there are no limitations on the thickness of the radially inner section 124 and the radially outer section 126.

The bonding interface 128 produced between the radially inner section 124 and the radially outer section 126 as a result of the magnetic pulse welding process exhibits a characteristically rippled or sinusoidal geometry. Although some heat may be generated along the bonding interface during the magnetic pulse welding process, a heat affected zone along the bonding interface 128 is notably absent.

FIG. 3 illustrates another embodiment of a composite piston ring 210. The piston ring 210 comprises a split annular body 212 having an inner circumferential surface 214, an outer circumferential surface 216, and opposing first and second ends 218, 220 that define a gap 222 therebetween. The body 212 of the piston ring 210 is of unitary, integral, one-piece construction and comprises a radially inner section 224, a radially outer section 226, and an intermediate section 228. The radially inner section 224 and the intermediate section 228 are metallurgically bonded to each other along a first bonding interface 230, and the radially outer section 226 and the intermediate section 228 are metallurgically bonded to each other along a second bonding interface 232.

Each of the sections 224, 226, 228 of the body 212 comprise a radially inner portion and a radially outer portion. The radially inner portion of the inner section 224 of the body 212 defines the inner circumferential surface 214 of the body 212, and the radially outer portion of the outer section 226 of the body 212 defines the outer circumferential surface 216 of the body 212. The radially outer portion of the inner section 224 and the radially inner portion of the intermediate section 228 are metallurgically bonded to each other along the first bonding interface 230, and the radially outer portion of the intermediate section 228 and the radially inner portion of the outer section 226 are metallurgically bonded to each other along the second bonding interface 232.

The composite piston rings 110, 210 are manufactured via a method that may include four stages: a providing stage, a positioning stage, a magnetic pulse welding stage, and one or more finishing stages. In a first stage of the process, one or more piston ring preforms are provided, with each of the piston ring preforms having at least one bonding surface. The shape in which the piston ring preforms are provided is not limited and may vary based upon a number of factors, including the desired structure of the resulting composite piston ring and the intended application of use. For example, the piston ring preforms may be provided in the form of steel or cast iron wires, sheets, rings, or cylinders.

In a second stage, the piston ring preforms are arranged in spaced apart relationship to one another such that each bonding surface in the arrangement faces toward another bonding surface. For example, the piston ring preforms are arranged such that each bonding surface in the arrangement is spaced apart from another bonding surface by a gap in the range of 0.5-5 mm, including all ranges and subranges therebetween. In one specific example, each bonding surface in the arrangement may be spaced apart from another bonding surface by a gap in the range of 1-2 mm, including all ranges and subranges therebetween.

The bonding surfaces of the piston ring preforms may or may not be pre-treated prior to the welding stage, for example, to remove surface oxides and other impurities. In one form, the bonding surfaces of the piston ring preforms may be pre-treated by traditional cleaning process, such as coiling, grinding, or any other mechanical and/or chemical pre-treatment process known in the art. Alternatively, the bonding surfaces of the preforms may be left untreated prior to the welding stage. In such case, the electromagnetic force generated during the welding stage may be sufficient to remove oxides, lubricants, and/or other environmental impurities from the bonding surfaces as they are accelerated toward each other, just prior to formation of the metallurgical bond.

Figure 4:
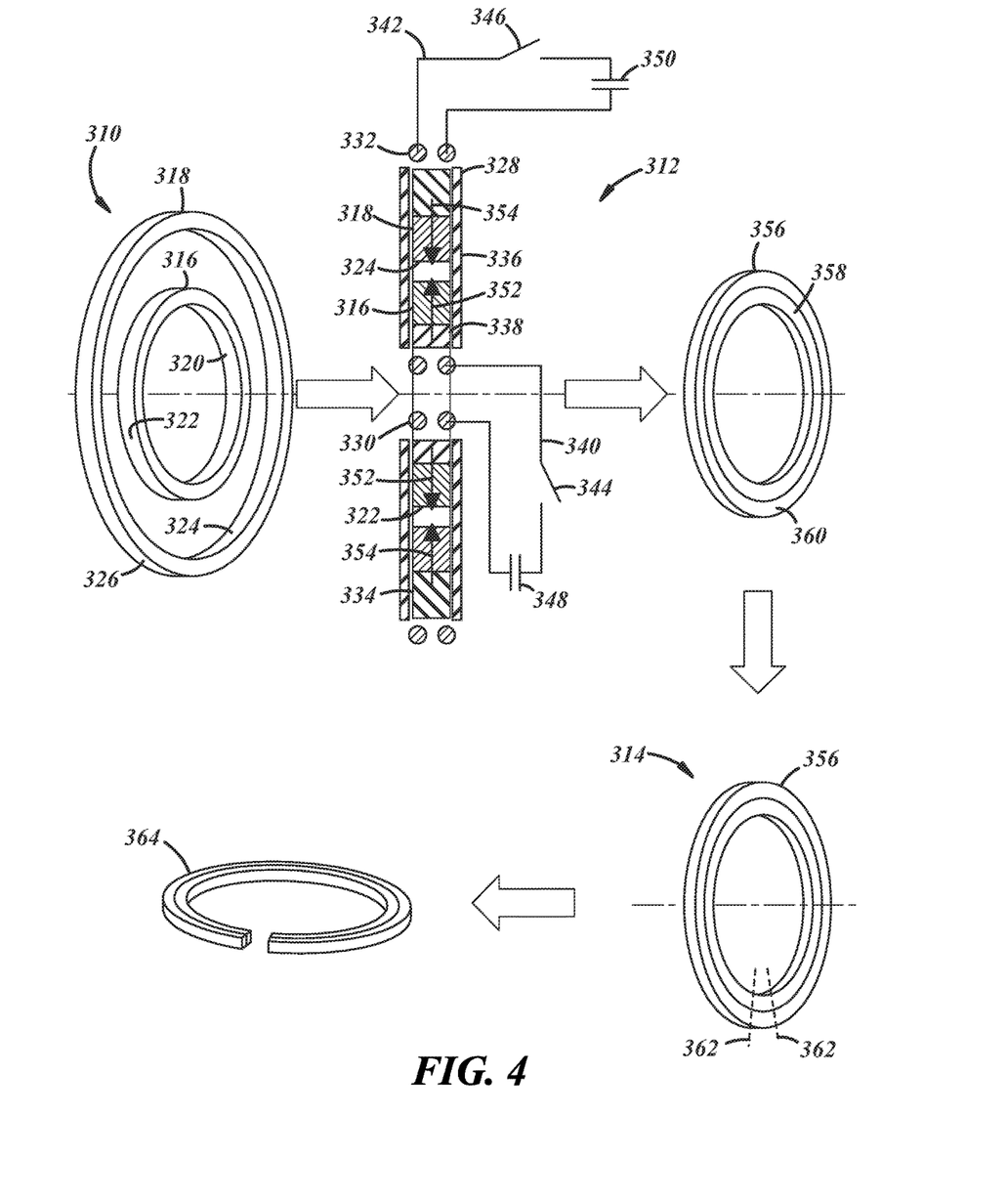
FIG. 4 is a diagrammatic illustration of a method of manufacturing a composite piston ring from a pair of annular piston ring preforms.
Figure 5:
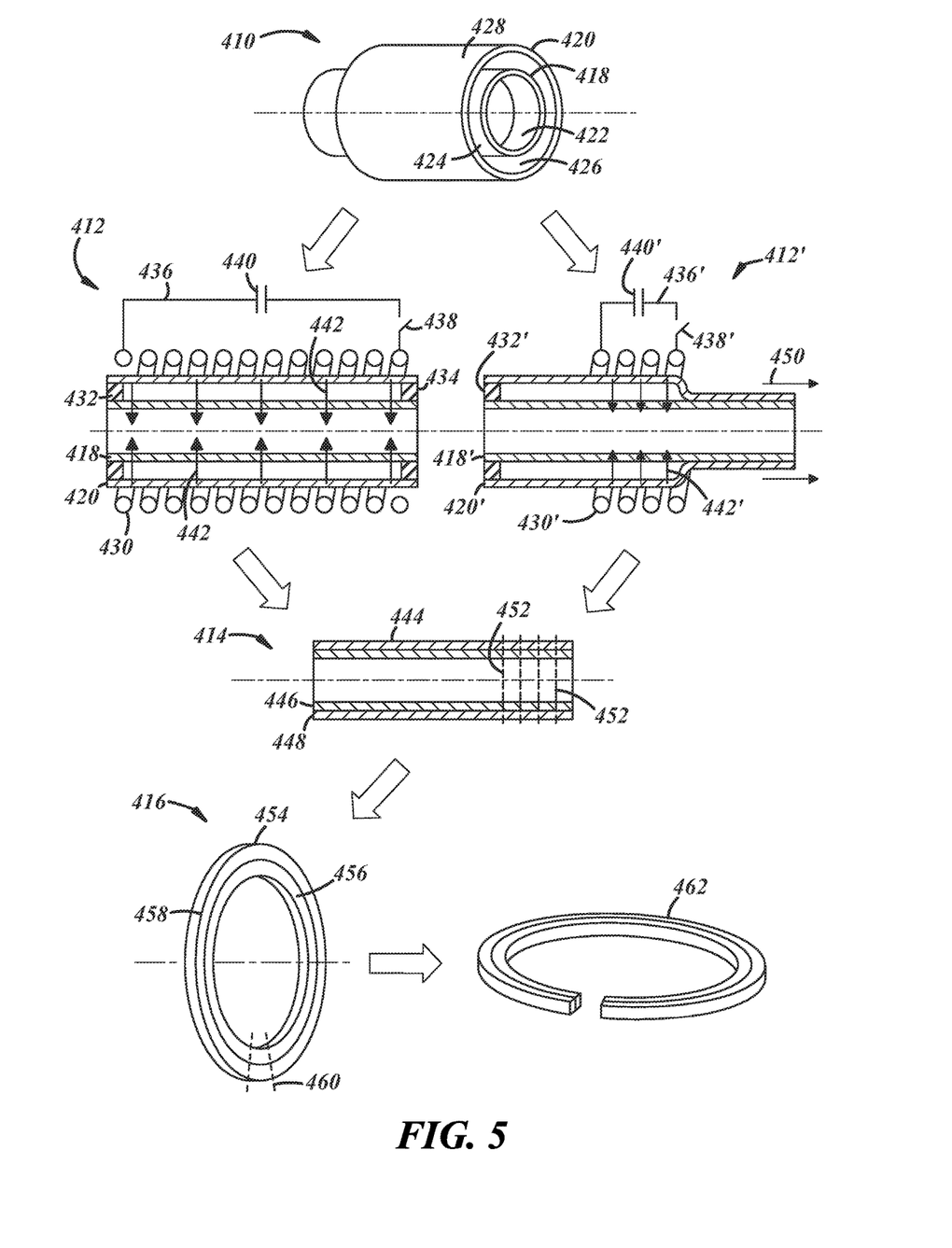
FIG. 5 is a diagrammatic illustration of alternative methods of manufacturing a composite engine component such as a composite piston ring from a pair of cylindrical piston ring preforms.
Figure 6:
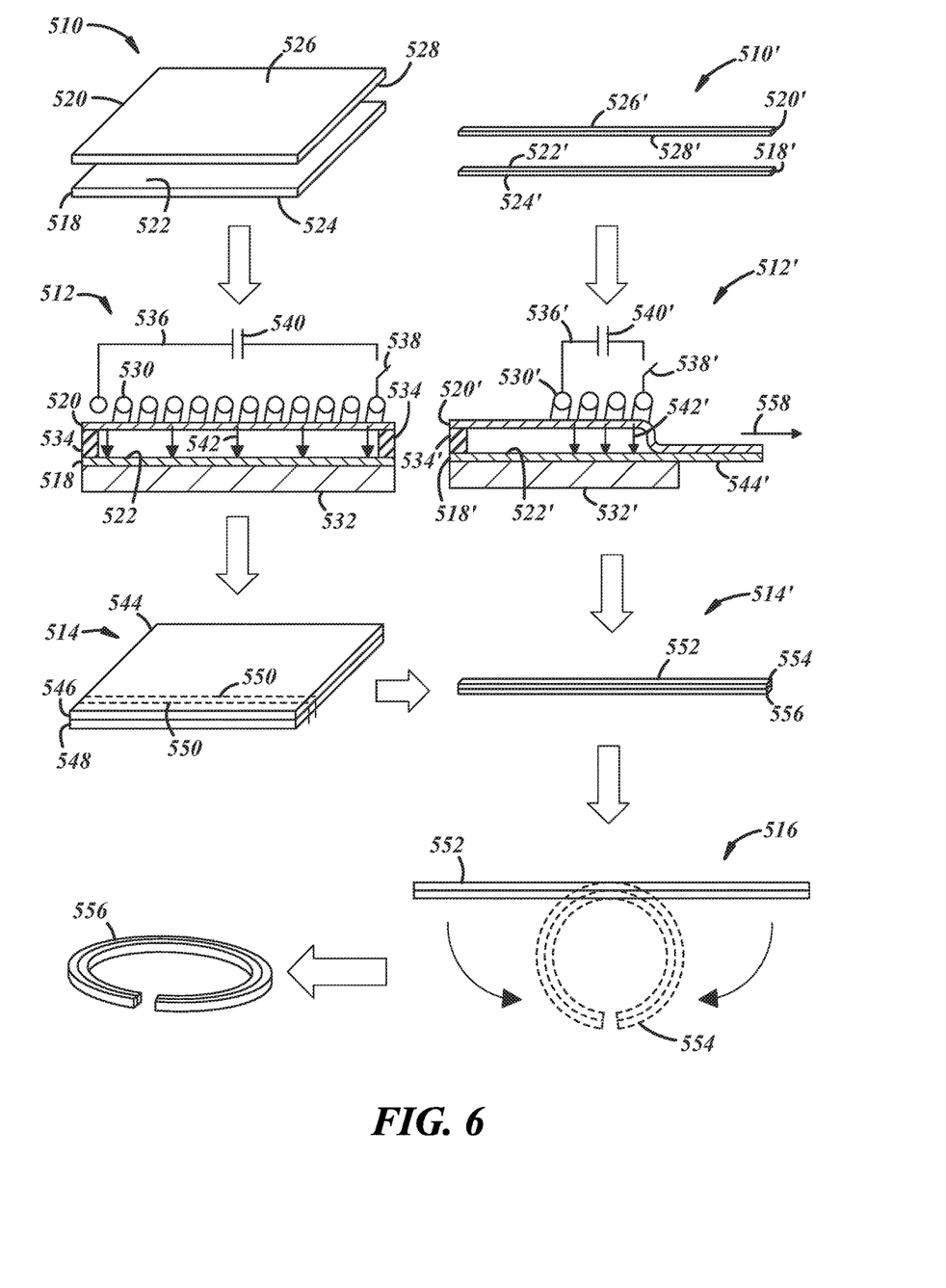
FIG. 6 is a diagrammatic illustration of alternative methods of manufacturing a composite piston ring from a pair of piston ring preforms that comprise a pair of metal sheets or wires.

Referring now to FIGS. 4-6, in a third stage, the piston ring preforms are welded together along their bonding surfaces using a magnetic pulse welding process to form a composite piston ring blank. To initiate the magnetic pulse welding process, the piston ring preforms are placed in close proximity to an inductor coil. The inductor coil is energized by passing a high-energy pulse of electrical current through the coil such that an electromagnetic field is generated around the coil and around at least one of the piston ring preforms, thereby inducing an eddy current in the preform and an opposing magnetic field. As a result, the bonding surface of the piston ring preform is accelerated away from the inductor coil and into contact with a bonding surface of another piston ring preform at a sufficient velocity to form a metallurgical bond along the bonding surfaces of the preforms. The velocity reached by the piston ring preform prior to contact may depend upon a number of factors, including the size and material composition of the piston ring preforms, the distance at which the preforms are spaced apart from one another, and the parameters of the magnetic pulse welding process, such as the magnitude of the electrical current passing through the coil.

After formation of the composite piston ring blank, one or more finishing stages may be carried out to transform the composite piston ring blank into a composite piston ring having a final desired shape, size, and finish. For example, in some embodiments, the piston ring blank may be non-circular and may need to be coiled or formed into a ring shape. As another example, the piston ring blank may comprise a continuous ring and a radial segment of the ring may need to be removed therefrom to form a split ring. In addition, one or more exterior surfaces of the piston ring blank may need to be ground, lapped, and/or coated to transform it into a finished composite piston ring. In one form, an outer circumferential surface of the piston ring blank may be treated by a nitride diffusion process and/or coated with a wear resistant coating.

In embodiments where it is desirable to produce other composite engine components, such as a composite cylinder liner, the finishing stage may be modified such that the blank is transformed into a specific engine component, instead of a piston ring. For example, in some embodiments, the composite engine component blank may comprise a flat sheet and may need to be coiled or formed into a final desired shape of a specific engine component, such as a cylinder. As another example, the composite engine component blank may comprise a continuous cylinder, which may need to be cut to a desired length. Also, one or more exterior surfaces of the composite engine component blank may need to be ground, lapped, and/or coated to transform the blank into a finished composite engine component.

FIG. 4 illustrates a method of manufacturing a composite piston ring that includes a providing stage 310, a positioning stage and a welding stage (shown together at 312), and a finishing stage 314. In the providing stage 310, a pair of first and second piston ring preforms 316, 318 are provided. The first piston ring preform 316 has an annular shape and comprises an inner circumferential surface 320 and an outer circumferential surface 322, with the outer circumferential surface 322 comprising a bonding surface of the first piston ring preform 316. The second piston ring preform 318 also has an annular shape and comprises an inner circumferential surface 324 and an outer circumferential surface 326, with the inner circumferential surface 324 comprising a bonding surface of the second piston ring preform 318.

In the positioning stage 312, the first and second annular piston ring preforms 316, 318 are positioned within a support structure 328 and disposed between a pair of inner and outer inductor coils 330, 332. The annular piston ring preforms 316, 318 are positioned within the support structure 328 so that the preforms 316, 318 are concentrically arranged, one within the other. The support structure 328 may comprise a plurality of sub-supporting structures 334, 336, 338, which may help align the preforms 316, 318 and maintain a desired spacing between the bonding surfaces of the preforms 316, 318. Each of the coils 330, 332 are electrically connected to a circuit 340, 342 that includes a switch 344, 346 and one or more capacitors 348, 350.

During the welding stage 312, one or both of the switches 344, 346 are closed (not shown) and the preforms 316, 318 accelerate away from the coils 330, 332 and toward each other in the direction of the arrows 352, 354, respectively. A metallurgical bond is formed along the bonding surfaces of the preforms 316, 318 upon contact to produce a composite piston ring blank 356 of unitary, integral, one-piece construction that comprises a radially inner section 358 and a radially outer section 360 having different chemical compositions. One or both of the preforms 316, 318 may be plastically deformed during formation of the composite piston ring blank 356.

Thereafter, in the finishing stage 314, a radial segment of the composite piston ring blank 356 is removed by cutting the blank 356 along dashed lines 362 to form a finished composite piston ring 364.

A composite engine component, such as a composite cylinder liner, alternatively may be formed by suitable modification to the method illustrated in FIG. 4. For example, a composite cylinder liner may be produced by providing a pair of cylindrical first and second cylinder liner preforms in the providing stage 310, instead of a pair of first and second piston ring preforms 316, 318, and eliminating the finishing stage 314.

FIG. 5 illustrates another method of manufacturing a composite piston ring. The method illustrated in FIG. 5 includes a providing stage 410, a positioning stage and a welding stage (shown together at 412), a blank forming stage 414, and a finishing stage 416. In the providing stage 410, a pair of first and second piston ring preforms 418, 420 are provided. The first piston ring preform 418 has a cylindrical shape and comprises an inner circumferential surface 422 and an outer circumferential surface 424, with the outer circumferential surface 424 comprising a bonding surface of the first piston ring preform 418. The second piston ring preform 420 also has a cylindrical shape and comprises an inner circumferential surface 426 and an outer circumferential surface 428, with the inner circumferential surface 426 comprising a bonding surface of the second piston ring preform 420.

In the positioning stage 412, the first and second cylindrical piston ring preforms 418, 420 are concentrically arranged, one within the other, such that the second piston ring preform 420 is disposed around the first piston ring preform 418. In addition, the first and second cylindrical piston ring preforms 418, 420 are positioned within an inductor coil 430 and spaced about 0.25 mm to about 1.5 mm apart from each other. A pair of support structures 432, 434 optionally may be used to provide appropriate spacing between the preforms 418, 420. The coil 430 is electrically connected to a circuit 436 that includes a switch 438 and one or more capacitors 440. During the welding stage 412, the switch 438 is closed (not shown) and the second piston ring preform 420 accelerates away from the coil 430 and collapses around the first piston ring preform 418 in the direction of the arrows 442. When the second piston ring preform 420 collides with the first piston ring preform 418, a metallurgical bond is formed along the bonding surfaces of the preforms 418, 420 to form a composite cylindrical structure 444 that comprises a radially inner section 446 and a radially outer section 448 having different chemical compositions.

Alternative positioning and welding stages (shown together at 412') may be employed wherein the first and second cylindrical piston ring preforms 418', 420' are incrementally advanced in the direction of the arrows 450 through and an interior of the inductor coil 430'. A support structure 432' may help align the preforms 418', 420' and maintain a desired spacing between the bonding surfaces of the preforms 418', 420' as they pass through the inductor coil 430'. As before, the coil 430' is electrically connected to a circuit 436' that includes a switch 438' and one or more capacitors 440'. However, in this alternative welding stage 412', only a small portion of the first and second piston ring preforms 418', 420' are disposed within the interior of the coil 430' at any given time. Therefore, when the switch 438' is closed (not shown), only the portion the second piston ring preform 420' that is disposed within the interior of the coil 430' accelerates away from the coil 430' and collapses around the first piston ring preform 418' in the direction of the arrows 442'. Each time a portion of the second piston ring preform 420' collides with the first piston ring preform 418', a metallurgical bond is formed along a corresponding portion of the bonding surfaces of the preforms 418', 420'. The composite cylindrical structure 444 may be incrementally formed in this way.

In the blank forming stage 414, the composite cylindrical structure 444 is cut along dashed lines 452 to form a composite piston ring blank 454 of unitary, integral, one-piece construction that comprises a radially inner section 456 and a radially outer section 458 having different chemical compositions.

Thereafter, in the finishing stage 416, a radial segment of the composite piston ring blank 454 is removed by cutting the blank 454 along dashed lines 460 to form a finished composite piston ring 462.

One or more surface treatment processes may be performed after the finishing stage 416. Such processes may include machining the piston ring 462 into a final desired shape and/or applying one or more coatings thereto.

A composite engine component, such as a composite cylinder liner, alternatively may be formed by suitable modification to the method illustrated in FIG. 5. More specifically, in the blank forming stage 414, the composite cylindrical structure 444 may be cut into relatively long segments to form a plurality of composite cylinder liner blanks of unitary, integral, one-piece construction having a radially inner section and a radially outer section with different chemical compositions. Thereafter, these composite cylinder liner blanks may be subjected to one or more surface treatment and/or machining processes to produce a composite cylinder liner.

FIG. 6 illustrates yet another method of manufacturing a composite piston ring. The method illustrated in FIG. 6 includes a providing stage 510, a positioning stage and a welding stage (shown together at 512), a blank forming stage 514, and a finishing stage 516. In the providing stage 510, a pair of first and second piston ring preforms 518, 520 are provided. The first and second piston ring preforms 518 are provided in the form of metallic sheets. The first piston ring preform 518 has an upper surface 522 and a lower surface 524, with the upper surface 522 of the first piston ring preform 518 comprising a bonding surface of the first piston ring preform 518. The second piston ring preform 520 has an upper surface 526 and a lower surface 528, with the lower surface 528 of the second piston ring preform 520 comprising a bonding surface of the second piston ring preform 520.

In the positioning stage 512, the first and second piston ring preforms 518, 520 are arranged in overlapping fashion such that the second piston ring preform 520 is disposed above the first piston ring preform 518. The first piston ring preform 518 is supported on a support structure 532. The second piston ring preform 420 is positioned below an inductor coil 530 and is spaced apart from the first piston ring preform 518 by one or more spacers 534. The coil 530 is electrically connected to a circuit 536 that includes a switch 538 and one or more capacitors 540.

During the welding stage 512, the switch 538 is closed (not shown) and the second piston ring preform 520 accelerates away from the coil 530 and toward the upper surface 522 of the first piston ring preform 518 in the direction of the arrows 542. When the second piston ring preform 520 collides with the first piston ring preform 518, a metallurgical bond is formed along the bonding surfaces of the preforms 518, 520 to form a composite sheet 544 that comprises an upper section 546 and a lower section 548 having different chemical compositions.

In the blank forming stage 514, the composite sheet 544 is cut along dashed lines 550 to form a composite piston ring blank 552 of unitary, integral, one-piece construction that comprises an upper section 554 and a lower section 556 having different chemical compositions.

Thereafter, in the finishing stage 516, the composite piston ring blank 552 is rolled or otherwise formed into the shape of an annular split body (dashed lines 554) to form a finished composite piston ring 556.

In an alternative providing stage 510', a pair of first and second piston ring preforms 518', 520' may be provided in the form of metallic wires. The first piston ring preform 518' has an upper surface 522' and a lower surface 524', with the upper surface 522' of the first piston ring preform 518' comprising a bonding surface of the first piston ring preform 518'. The second piston ring preform 520 has an upper surface 526' and a lower surface 528', with the lower surface 528' of the second piston ring preform 520' comprising a bonding surface of the second piston ring preform 520'.

An alternative positioning stage 512' also may be employed wherein the first and second piston ring preforms 518', 520' are incrementally advanced in the direction of the arrow 558 between an inductor coil 530' and a support structure 532'. A spacer 534' may be employed to help maintain a desired spacing between the bonding surfaces of the preforms 518', 520' as they pass between the inductor coil 530' and the support structure 532'. As before, the coil 530' is electrically connected to a circuit 536' that includes a switch 538' and one or more capacitors 540'.

In yet another alternative, the first and second piston ring preforms may be provided in the form of continuous coiled wires (not shown). In such case, the piston ring preforms may be uncoiled as they are incrementally advanced in the direction of the arrow 558 between the inductor coil 530' and the support structure 532'. Thereafter, in the blank forming stage 514', the piston ring preforms may cut into desired lengths to form the composite piston ring blank 552.

In one form, only a small portion of the first and second piston ring preforms 518', 520' are disposed between the inductor coil 530' and the support structure 532' at any given time. As such, when the switch 538' is closed (not shown), only the portion the second piston ring preform 520' that is disposed below the inductor coil 530' accelerates away from the coil 530' and toward the upper surface 522' of the first piston ring preform 518' in the direction of the arrows 542'. Each time a portion of the second piston ring preform 520' collides with the first piston ring preform 518', a metallurgical bond is formed along a corresponding portion of the bonding surfaces of the preforms 518', 520'. A composite wire 544' may be incrementally formed in this way, which may be cut into sections (not shown) in an alternative blank forming stage 514' to form the composite piston ring blank 552.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A composite engine component comprising:
a body having an outer circumferential surface and an inner circumferential surface,
wherein the body is of integral unitary construction and comprises a radially inner section and a radially outer section having a different material composition than that of the radially inner section,
wherein the radially inner section and the radially outer section are metallurgically bonded to one another or to an intermediate section of the body along a bonding interface,
wherein an intermetallic phase is absent along the bonding interface, and
wherein the body comprises (i) a cylinder, or (ii) a split annulus having opposing first and second ends and a gap defined by the opposing first and second ends.

2. The engine component set forth in claim 1 wherein the radially inner section of the body comprises a first metallic material and the radially outer section of the body comprises a second metallic material having a different material composition than that of the first metallic material.

3. The engine component set forth in claim 1 wherein the radially inner section of the body has a coefficient of thermal expansion that is less than that of the radially outer section at the same temperature.

4. The engine component set forth in claim 1 wherein the radially inner section of the body has a thermal conductivity that is less than that of the radially outer section at the same temperature.

5. The engine component set forth in claim 1 wherein the radially inner section of the body has a mean coefficient of linear thermal expansion of $10\text{-}11.5\times10^{-6}$/K and the radially outer section of the body has a mean coefficient of thermal expansion in the range of $12\text{-}14\times10^{-6}$/K.

6. The engine component set forth in claim 1 wherein the body comprises an intermediate section extending between the radially inner section and the radially outer section thereof, with the inner, intermediate, and outer sections of the body each having a different chemical composition, and wherein the intermediate section is metallurgically bonded to the radially outer section of the body along a first bonding interface and the intermediate section is metallurgically bonded to the radially inner section of the body along a second bonding interface.

7. A method of manufacturing an engine component from at least two different metals or metal alloys, the method comprising:
providing a first preform having a first bonding surface and a second preform having a second bonding surface, the material composition of the first preform being different than that of the second preform;
arranging the first and second preforms in spaced apart relationship to one another such that the first and second bonding surfaces face one another;
welding the first and second preforms together to form a composite engine component blank using a magnetic pulse welding process in which a metallurgical bond is formed along the first and second bonding surfaces of the first and second preforms; and
forming the composite engine component blank into the shape of:
(i) a split annulus having a radially inner section and a radially outer section with different material compositions, or
(ii) a cylinder having a radially inner section and a radially outer section with different material compositions.

8. The method set forth in claim 7 wherein, prior to welding, the first and second bonding surfaces of the first and second preforms are separated from each other by a gap in the range of 0.25-1.5 mm.

9. The method set forth in claim 7 wherein the first and second preforms comprise wires, sheets, rings, or cylinders.

10. The method set forth in claim 7 wherein an intermetallic phase is not formed along the first and second bonding surfaces of the first and second preforms during formation of the metallurgical bond.

11. The method set forth in claim 7 wherein the first and second preforms are welded to one another by:
placing an inductor coil in proximity to an outer surface of at least one of the first and second preforms; and
energizing the inductor coil by a passing a high-energy pulse of electrical current through the coil to generate an electromagnetic field around at least one of the first and second preforms such that at least one of the first and second preforms is accelerated away from the inductor coil and into contact with another preform at a sufficient velocity to weld the preforms to one another.

12. The method set forth in claim 7 comprising:
machining one or more surfaces of the composite engine component blank to a desired final shape, size, and finish.

13. A composite piston ring manufactured according to the method set forth in claim 7.

14. A composite cylinder liner manufactured according to the method set forth in claim 7.

* * * * *